(12) United States Patent
Huang et al.

(10) Patent No.: US 11,607,842 B2
(45) Date of Patent: Mar. 21, 2023

(54) THERMAL SUPPORTS FOR 3D FEATURES FORMED FROM PARTICLES

(71) Applicant: HEWLETT-PACKARD DEVELOPMENT COMPANY, L.P., Spring, TX (US)

(72) Inventors: Wei Huang, Palo Alto, CA (US); Gary J. Dispoto, Palo Alto, CA (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 16/606,275

(22) PCT Filed: Oct. 25, 2017

(86) PCT No.: PCT/US2017/058362
§ 371 (c)(1),
(2) Date: Oct. 18, 2019

(87) PCT Pub. No.: WO2019/083531
PCT Pub. Date: May 2, 2019

(65) Prior Publication Data
US 2021/0114290 A1 Apr. 22, 2021

(51) Int. Cl.
*B29C 64/165* (2017.01)
*B29C 64/218* (2017.01)
(Continued)

(52) U.S. Cl.
CPC .......... *B29C 64/165* (2017.08); *B29C 64/218* (2017.08); *B29C 64/268* (2017.08);
(Continued)

(58) Field of Classification Search
CPC ........ B22F 10/40; B22F 10/368; B22F 10/85; B22F 12/90; B22F 10/14; B29C 64/40;
(Continued)

(56) References Cited

U.S. PATENT DOCUMENTS 6,036,777 A 3/2000 Sachs
2014/0004374 A1 1/2014 Cohen
(Continued)

FOREIGN PATENT DOCUMENTS

CH 706380 A1 10/2013
CN 102325645 A 1/2012
(Continued)

OTHER PUBLICATIONS

How to Design Parts for Metal 3d Printing, https://www.3dhubs.com/knowledge-base/how-design-parts-metal-3d-printing.
(Continued)

*Primary Examiner* — Yunju Kim
(74) *Attorney, Agent, or Firm* — Shook, Hardy & Bacon L.L.P.

(57) ABSTRACT

According to examples, a three-dimensional (3D) fabrication system may include a controller to identify a feature of an object to be fabricated and based on the identified feature having a size that is smaller than a predefined size, determine a thermal support for the identified feature. The controller may also control fabrication components to form, through application of energy, the determined thermal support from a first set of particles, form an intermediate section adjacent to the formed thermal support from a second set of particles, and form, through application of energy, the feature adjacent to the intermediate section from a third set of particles, in which heat from the thermal support is to reduce a thermal bleed rate of the third set of particles.

13 Claims, 4 Drawing Sheets

(51) Int. Cl.
  *B29C 64/268* (2017.01)
  *B29C 64/393* (2017.01)
  *B29C 64/40* (2017.01)
  *B33Y 40/00* (2020.01)
  *B33Y 10/00* (2015.01)
  *B33Y 30/00* (2015.01)
  *B33Y 50/02* (2015.01)

(52) U.S. Cl.
  CPC ............ *B29C 64/393* (2017.08); *B29C 64/40* (2017.08); *B33Y 40/00* (2014.12); *B33Y 10/00* (2014.12); *B33Y 30/00* (2014.12); *B33Y 50/02* (2014.12)

(58) Field of Classification Search
  CPC ... B29C 64/393; B29C 64/141; B29C 64/165; B29C 64/268
  USPC ........................................................ 264/40.1
  See application file for complete search history.

(56) References Cited

U.S. PATENT DOCUMENTS

| | | |
|---|---|---|
| 2015/0044318 A1 | 2/2015 | Ohkusa et al. |
| 2015/0048554 A1 | 2/2015 | Karrer et al. |
| 2015/0094837 A1 | 4/2015 | Cohen et al. |
| 2015/0231798 A1 | 8/2015 | Goto |
| 2015/0273582 A1 | 10/2015 | Crump et al. |
| 2016/0221264 A1 | 8/2016 | Doherty et al. |
| 2017/0136539 A1 | 5/2017 | Chou et al. |
| 2018/0111334 A1* | 4/2018 | Gold ........................ B22F 10/40 |
| 2019/0054691 A1* | 2/2019 | Abbott, Jr. .............. B22F 1/107 |

FOREIGN PATENT DOCUMENTS

| | | | | |
|---|---|---|---|---|
| CN | 104708821 | | 6/2015 | |
| CN | 105537587 | | 5/2016 | |
| CN | 106393685 | | 2/2017 | |
| CN | 106738874 | A | 5/2017 | |
| CN | 107008901 | | 8/2017 | |
| EP | 2835251 | A1 | 2/2015 | |
| JP | 2017-185696 | A | 10/2017 | |
| WO | 2010/075395 | A2 | 7/2010 | |
| WO | WO2013030064 | A1 | 3/2013 | |
| WO | 2015/056230 | A1 | 4/2015 | |
| WO | 2015/063923 | A1 | 5/2015 | |
| WO | WO-2015108544 | | 7/2015 | |
| WO | WO-2015136277 | | 9/2015 | |
| WO | WO-2015167530 | A2 * | 11/2015 | ............. B33Y 30/00 |
| WO | WO-2016068899 | | 5/2016 | |
| WO | 2016/139287 | A1 | 9/2016 | |
| WO | WO-2016140670 | A1 * | 9/2016 | ............. B33Y 10/00 |

OTHER PUBLICATIONS

Metal 3d Printing Technology Overview, https://www.sculpteo.com/blog/2017/05/31/innovation-in-metal-3d-printing-dissolvable-3d-printed-supports/.

* cited by examiner

```
┌─────────────────────────────────────────────┐
│ DETERMINE THAT PARTICLES FORMING A FEATURE  │
│ ARE CALCULATED TO REACH A FIRST TEMPERATURE │
│ AND/OR REMAIN BELOW A CERTAIN TEMPERATURE   │
│ FOR A PERIOD OF TIME DURING FORMATION OF THE│
│ FEATURE, THE FIRST TEMPERATURE BEING BELOW  │
│         THE CERTAIN TEMPERATURE             │
│                    402                      │
└─────────────────────────────────────────────┘
                      │
                      ▼
┌─────────────────────────────────────────────┐
│ DEVISE A THERMAL SUPPORT TO INCREASE THE    │
│ TEMPERATURE OF THE PARTICLES FORMING THE    │
│ FEATURE ABOVE THE FIRST TEMPERATURE AND/OR  │
│ INCREASE A LENGTH OF TIME AT WHICH THE      │
│ PARTICLES FORMING THE FEATURE REMAIN ABOVE  │
│           THE FIRST TEMPERATURE             │
│                    404                      │
└─────────────────────────────────────────────┘
                      │
                      ▼
┌─────────────────────────────────────────────┐
│ CONTROL FABRICATION COMPONENTS TO FORM THE  │
│         DEVISED THERMAL SUPPORT             │
│                    406                      │
└─────────────────────────────────────────────┘
                      │
                      ▼
┌─────────────────────────────────────────────┐
│ CONTROL FABRICATION COMPONENTS TO FORM THE  │
│           AN INTERMEDIATE SECTION           │
│                    408                      │
└─────────────────────────────────────────────┘
                      │
                      ▼
┌─────────────────────────────────────────────┐
│ CONTROL FABRICATION COMPONENTS TO FORM THE  │
│                  FEATURE                    │
│                    410                      │
└─────────────────────────────────────────────┘
```

*FIG. 4*

THERMAL SUPPORTS FOR 3D FEATURES FORMED FROM PARTICLES

BACKGROUND

In three-dimensional (3D) printing, an additive printing process is often used to make three-dimensional solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat and/or a chemical binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

As discussed herein, when features of a 3D object are relatively small, e.g., fine details of a 3D object, the particles forming the feature may not reach a sufficient temperature for proper melting and fusing and the resulting features may be porous and may thus have low mechanical strength, an incorrect color, a low surface quality, improper surface roughness, etc. This may occur because as the particles are heated, heat may thermally bleed from the particle due to temperature differences between the particles being heated and adjacent particles that are not be heated, which may result in the heated particles failing to reach their melting point temperatures for a sufficient period of time.

Disclosed herein are 3D fabrication systems, apparatuses, and methods that may be implemented to form a thermal support for a feature of a 3D object that may enhance fusing of particles to form the feature. The thermal support for the feature may be formed to increase the temperature of the particles from which the feature is formed by heating an area next to or adjacent to the particles that are to form the feature. According to examples, a controller of the 3D fabrication systems or apparatuses disclosed herein may determine, based on a size of the feature, a calculated temperature of the particles from which the feature is formed, combinations thereof, or the like, when and where the thermal supports are to be formed to raise the temperature of the particles from which the feature is formed to a sufficient level for intended fusing. The controller may also determine the sizes and shapes of the thermal supports to sufficiently raise the temperature of the particles from which features are formed. In some examples, the controller may determine that a feature may be properly fused without the use of a thermal support and thus, the controller may selectively determine when thermal supports are to be implemented.

According to examples, the thermal support disclosed herein may be formed of heated particles that are fused together. In other examples, the thermal support disclosed herein may be formed of heated particles that are not fused together. For instance, droplets of a fusing agent may be deposited at a sufficiently low contone level to enable the temperature of the particles in the thermal support to be raised to a desired level without fusing. In some examples, the fusing agent may be a degradable agent that may degrade after a predefined period of time following receipt of the energy or in the presence of another agent. In these examples, the particles upon which the energy absorbing agent has been deposited may be recycled.

As the particles forming the feature may be at a higher temperature than the particles outside of the feature, thermal bleed may occur from the particles in the fusing area to the particles outside of the feature. When the feature is at or above a predefined size, the particles forming the feature may be heated and may remain heated at a sufficiently high temperature such that the thermal bleed that occurs may be insufficient to prevent those particles from melting and fusing together as intended, e.g., to have an intended strength, rigidity, hardness, color, translucency, surface roughness, combinations thereof, or the like. However, when the size of the feature is below the certain size, the rate at which thermal bleed occurs may result in the particles forming the feature from failing to reach and/or remain at or above the melting point temperature for sufficient melting to occur such that the particles fuse together as intended. The certain size may pertain to a thickness, a width, a length, an area, a volume, or combinations thereof, of the fusing area, which may extend across multiple layers of particles.

According to examples, by forming the thermal support near the feature, the rate of thermal bleed from the particles forming the feature may be reduced. In this regard, the thermal support may facilitate the melting and fusing together of the particles forming the feature. In other words, because the particles in the thermal support are at a higher temperature than the particles outside of the thermal support, the temperature of the particles outside of the thermal support may be increased. As such, the rate at which heat is transferred from the particles forming the feature to the particles may be reduced.

Through implementation of the 3D fabrication systems, apparatuses, and methods disclosed herein, 3D objects and/or features of 3D objects having relatively small sizes, e.g., fine features, may be fabricated to have substantially increased mechanical strength, more accurate colors, improved surface quality, and the like.

Before continuing, it is noted that as used herein, the terms "includes" and "including" mean, but is not limited to, "includes" or "including" and "includes at least" or "including at least." The term "based on" means "based on" and "based at least in part on."

Figure 1A:
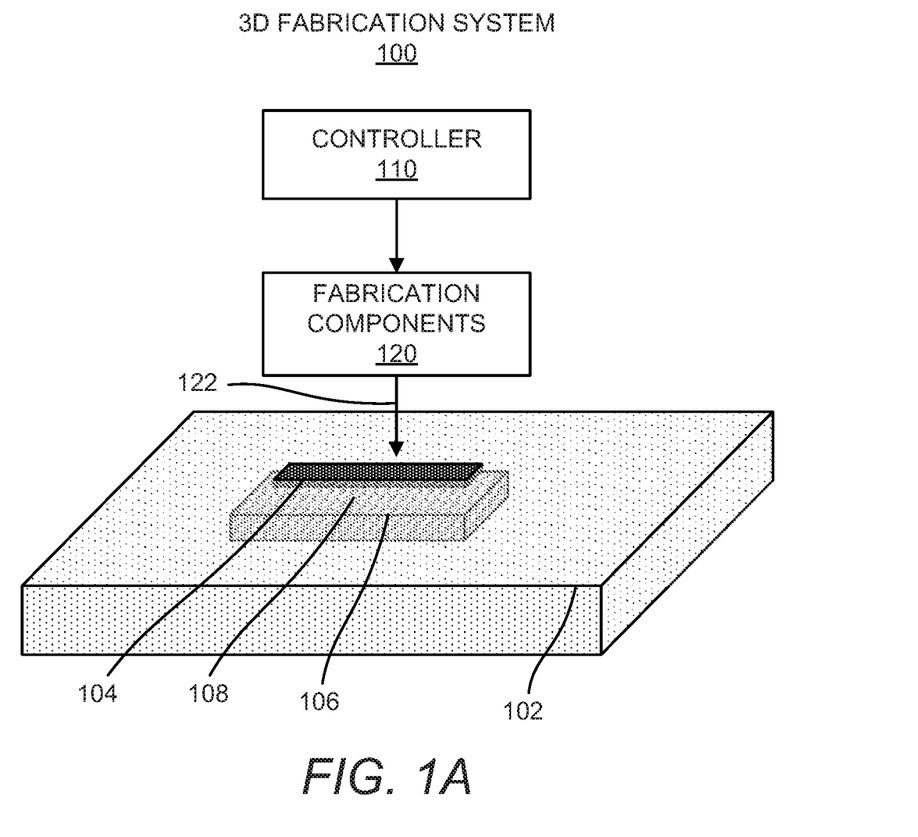
FIG. 1A shows a diagram of an example 3D fabrication system that may form a thermal support to reduce a rate at which particles forming a feature of a 3D object thermally bleed.

With reference first to FIG. 1A, there is shown a diagram of an example 3D fabrication system 100 that may form a thermal support to reduce a rate at which particles forming a feature of a 3D object thermally bleed. It should be understood that the 3D fabrication system 100 depicted in FIG. 1A may include additional components and that some of the components described herein may be removed and/or modified without departing from a scope of the 3D fabrication system 100 disclosed herein.

The 3D fabrication system 100 may also be termed a 3D printer, a 3D fabricator, or the like. Generally speaking, the 3D fabrication system 100 may be implemented to fabricate 3D objects from particles 102 of build material, which may also be termed build material particles 102. The particles 102 of build material may include any suitable material including, but not limited to, a polymer, a plastic, a ceramic, a nylon, a metal, combinations thereof, or the like, and may be in the form of a powder or a powder-like material. Additionally, the particles 102 may be formed to have dimensions, e.g., widths, diameters, or the like, that are generally between about 5 µm and about 100 µm. In other examples, the particles 102 may have dimensions that are generally between about 30 µm and about 60 µm. The particles 102 may have any of multiple shapes, for instance, as a result of larger particles being ground into smaller particles. In some examples, the powder may be formed from, or may include, short fibers that may, for example, have been cut into short lengths from long strands or threads of material.

As shown in FIG. 1A, the 3D fabrication system 100 may include a controller 110 and fabrication components 120. As discussed herein, in some examples, the fabrication components 120 may include an agent delivery system and an energy supply system. In other examples, the fabrication components 120 may include a laser beam device. In any of these examples, the fabrication components 120 may be implemented to apply energy as denoted by the arrow 122 onto a layer of particles 102 to selectively fuse the particles 102. For instance, the fabrication components 120 may be implemented to form a feature 104 of a 3D object to be fabricated. The fabrication components 120 may also include a recoater (not shown) that may apply successive layers of particles 102, from which portions of 3D objects may be formed layer by layer. The layers of particles 102 have been shown as being partially transparent to enable the feature 104 and a thermal support 106 to be visible. It should thus be understood that the particles 102 may not be transparent, but instead, may be opaque.

As the particles 102 forming the feature 104 may be at a higher temperature than the particles 102 that do not receive energy, thermal bleed may occur from the particles 102 forming the feature 104 to the particles 102 outside of the feature 104. That is, heat from the particles 102 forming the feature 104 may be transferred to the particles 102 in the areas surrounding the feature 104. When the feature 104 is at or above a certain size, the particles 102 forming the feature 104 may be heated and may remain heated at a sufficiently high temperature such that the thermal bleed that occurs may be insufficient to prevent the particles 102 from melting and fusing together as intended, e.g., to have an intended strength, rigidity, hardness, color, translucency, surface roughness, combinations thereof, or the like. However, when the size of the feature 104 is below the certain size, the rate at which thermal bleed occurs may result in the particles 102 forming the feature 104 from failing to reach and/or remain at or above the melting point temperature for sufficient melting to occur such that the particles 102 fuse together as intended, e.g., there may gaps between some of the particles 102. The certain size may pertain to a thickness, a width, a length, an area, a volume, or combinations thereof, of the feature 104, which may extend across multiple layers of particles 102. The certain size may also be referenced herein as a predefined size.

The certain size may depend, for instance, upon the type of particle 102, the type of fusing agent, the type and/or strength of energy emitted by an energy supply system of the fabrication components 120, combinations thereof, and the like. In some examples, the certain size may be determined through testing of different combinations of particle 102 types, fusing agent types, energy types and/or strengths, etc. In addition or in other examples, the certain size may be the same for different combinations of particle 102 types, fusing agent types, energy types and/or strengths, etc. In any of these examples, the controller 110 may determine when a feature 104 of a 3D object, which may encompass the entire 3D object, has a size that is smaller than the certain size. Based on a determination that the feature 104 has a size that is smaller than the certain size, the controller 110 may determine or devise a thermal support 106 for the feature 104. That is, for instance, the controller 110 may determine that a thermal support 106 for the feature 104 may be formed when the feature 104 has a size that is smaller than the certain size and may determine that a thermal support 106 is not to be formed when the feature 104 has a size that is larger than the certain size.

As shown in FIG. 1A, the thermal support 106 may be formed from a first set of particles 102 beneath and in relatively close proximity to the set of particles 102 forming the feature 104, in which the thermal support 106 does not form part of the 3D object and is not in contact with the feature 104. The feature 104 may be separated from the thermal support 106 by an intermediate section 108, which may be at least one layer of unfused particles 102. The intermediate section 108 may include a sufficient distance to keep particles 102 forming the feature 104 from fusing with particles 102 forming the thermal support 106. By way of particular example, the intermediate section 108 may include between about 10 layers and about 20 layers of unfused particles 102.

The thermal support 106 may be formed to have a relatively larger size than the feature 104. In one regard, the amount of energy supplied to form the thermal support 106 may be relatively higher than the amount of energy supplied to form the feature 104. As the particles 102 may become heated through receipt of the energy, the particles 102 forming the thermal support 106 may be at a relatively higher temperature than the particles 102 forming the feature 104 during formation of the thermal support 106 and the feature 104. The thermal support 106 may therefore increase the temperature of the particles 102 near the thermal support 106. For instance, the thermal support 106 may increase the temperature of the particles within about 10 or about 20 layers of the thermal support 106. The increase in temperature may reduce the thermal gradient between the particles 102 forming the feature 104 and the particles 102 outside of the feature 104, which may enable the particles 102 forming the feature 104 to fuse together with greater mechanical strength.

According to examples disclosed herein, the thermal support 106 may reduce the rate at which thermal bleed occurs from the particles 102 forming the feature 104. In this regard, the thermal support 106 may facilitate the melting and fusing together of the particles 102 forming the feature 104. In other words, because the particles 102 in the thermal support 106 are at a higher temperature than the particles 102 outside of the thermal support 106, a thermal gradient between the particles 102 in the feature 104 and the particles 102 in the thermal support 106 may be smaller than a thermal gradient between the particles 102 in the feature 104 and the particles 102 outside of the thermal support 106. This may result in the particles 102 forming the feature 104 reaching a higher temperature, which may reduce the effects of thermal bleed and those particles 102 may reach and/or remain at a sufficiently high temperature for those particles 102 to melt and fuse together as intended, e.g., with sufficient mechanical strength.

In some examples, the thermal support 106 may have a similar cross-sectional shape and size to the feature 104, in which case the thermal support 106 may be conformal to the feature 104. In other examples, the thermal support 106 may be a non-conformal support, in which the thermal support 106 may have a larger cross-sectional shape than the feature 104. In any of these examples, the fabrication components 120 may function to increase the temperature of the particles 102 around the thermal support 106 without causing those particles 102 to fuse together or with the particles 102 forming the thermal support 106.

According to examples in which the fabrication components 120 include a laser beam device, the controller 110 may control the laser beam device to selectively energize and melt the sets of particles 102 forming the thermal support 106 and the feature 104. In these examples, the fabrication components 120 may also include a recoater to apply successive layers of the particles 102. In other examples, and as discussed herein, the fabrication components may include a fusing agent delivery device and an energy supply system.

Figure 1B:
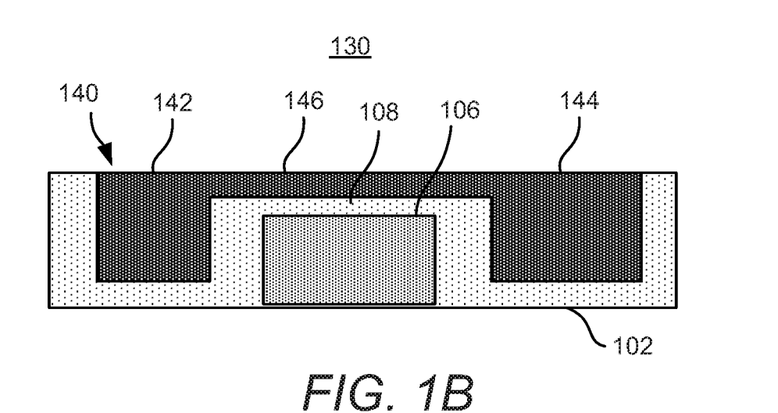
FIG. 1B shows a cross-sectional side view of a build envelope 130 in which an example 3D object and an example thermal support may be formed.

With reference now to FIG. 1B, there is shown a cross-sectional side view of a portion of a build envelope 130 in which an example 3D object 140 and an example thermal support 106 may be formed. The build envelope 130 may be a build area in which the fabrication components 120 may fabricate 3D objects. As shown, the 3D object 140 may include a first feature 142 and a second feature 144 that are relatively larger than a third feature 146. In the example shown in FIG. 1B, the controller 110 may determine that the first feature 142 and the second feature 144 are larger than the predefined size discussed above, while the third feature 146 is smaller than the predefined size. In this example, the controller 110 may determine that the thermal support 106 is to be formed beneath the third feature 146 and that a thermal support 106 may not be formed beneath the first feature 142 or the second feature 144. Accordingly, the controller 110 may determine when and where a thermal support 106 is to be formed with respect to a 3D object 140 or with respect to features 142-146 of the 3D object 140. In addition, in various examples, the controller 110 may form a thermal support 106 to increase a local temperature around the thermal support 106 to, for instance, make the temperature distribution on a particle bed more uniform.

Figure 2:
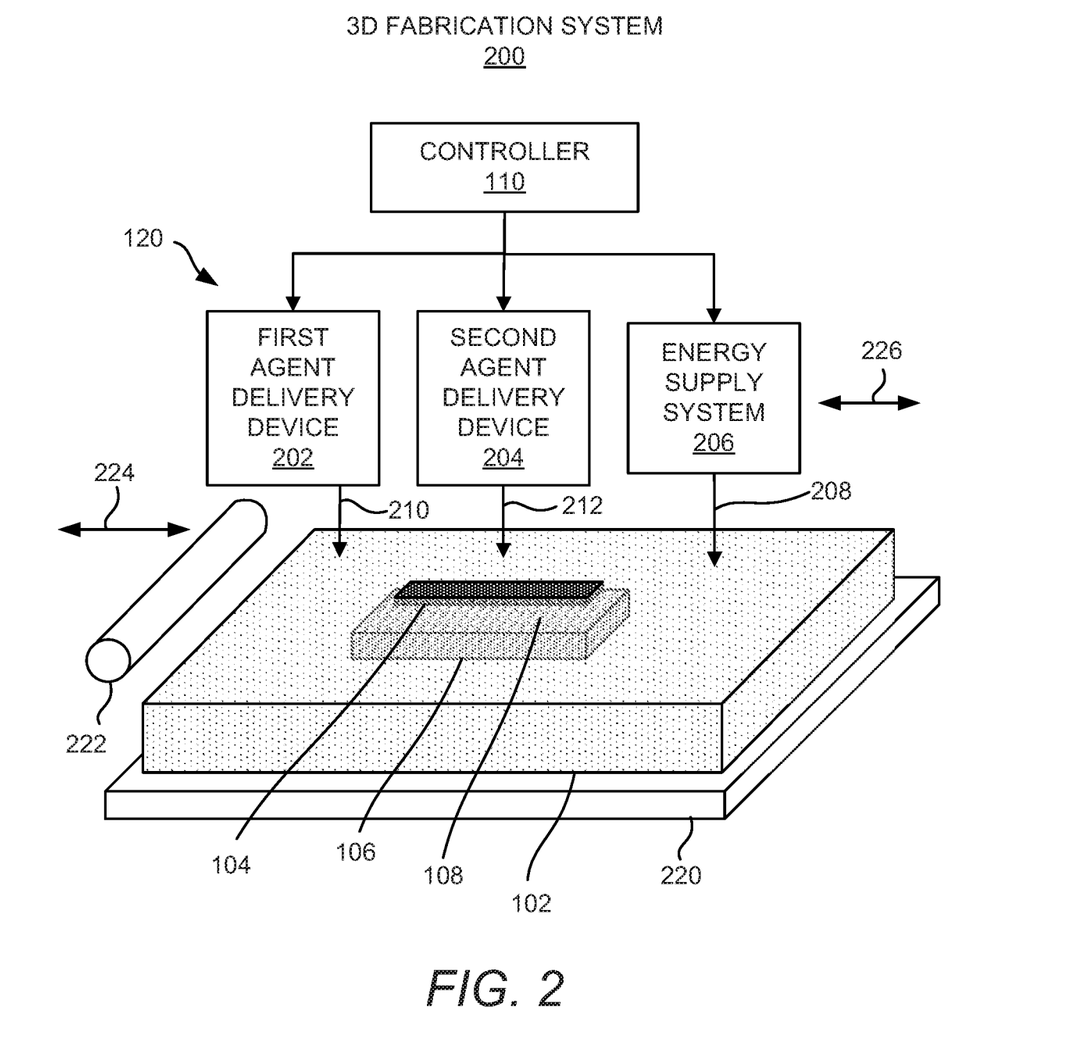
FIG. 2 shows a diagram of another example 3D fabrication system that may form a thermal support near a feature of a 3D object to reduce a rate at which particles forming the feature thermally bleed.

Turning now to FIG. 2, there is shown a diagram of another example 3D fabrication system 200 that may form a thermal support 106 near a feature 104 of a 3D object to reduce a rate at which particles 102 forming the feature 104 thermally bleed. The 3D fabrication system 200 may be similar to the 3D fabrication system 100 depicted in FIG. 1A and may include many of the same components. However, in the 3D fabrication system 200, the fabrication components 120 may include a first agent delivery device 202, a second agent delivery device 204, and an energy supply system 206.

According to examples, the controller 110 may control the first agent delivery device 202 to selectively deposit a fusing agent, which is represented by the arrow 210, onto sets of particles 102 to form the thermal support 106 and the feature 104. The controller 110 may also control the energy supply system 206 to supply energy, which is represented by the arrow 208, onto the particles 102 following the selective deposition of the fusing agent 210 onto the particles 102. The same fusing agent 210 may be used to form both the thermal support 106 and the feature 104. In some examples, however, the first agent delivery device 202 may be operated to deposit droplets of the fusing agent 210 at different concentration levels, e.g., contone levels, to form the thermal support 106 and the feature 104. That is, for instance, the controller 110 may control the first agent delivery device 202 to deposit droplets of the fusing agent 210 at a higher contone level to form the feature 104 than to form the thermal support 106.

By way of particular example, the controller 110 may control the first agent delivery device 202 to deposit droplets of the fusing agent 210 onto the particles 102 forming the thermal support 106 at a contone level that enables those particles 102 to become heated when energy 208 is applied to those particles 102, without causing those particles 102 to melt. In this regard, the particles 102 forming the thermal support 106 may remain unfused following deposition of the fusing agent 210 and application of the energy 208. In these examples, droplets of the fusing agent 210 may also be deposited on the particles 102 forming the intermediate section 108, in which case the intermediate section 108 may form part of the thermal support 106. This may further increase the temperature of the particles 102 from which the feature 104 is formed. However, in other examples, the fusing agent 210 may be deposited at a contone level that enables those particles 102 forming the thermal support 106 to melt during receipt of the energy 208 and to thus fuse together without the fusing agent 210 being deposited onto those particles 102 forming the intermediate section 108. In addition or alternatively to controlling the contone level at which the fusing agent 210 is deposited, an amount of cooling agent and/or defusing agent may be mixed or supplied with the fusing agent 210 to achieve similar results.

The fusing agent 210 may be a liquid, such as an ink, a pigment, a dye, or the like, that may enhance absorption of energy 208 emitted from the energy supply system 206. The first agent delivery device 202 may deliver the fusing agent 210 in the form of droplets onto the layer of particles 102 such that the droplets of fusing agent 210 may be dispersed on the particles 102 and within interstitial spaces between the particles 102 forming the feature 104 and in some examples, the thermal support 106. In forming the feature 104, the droplets of fusing agent 210 may be supplied at a sufficient density, e.g., contone level, to enhance absorption of sufficient energy 208 to cause the temperature of the particles 102 on which the fusing agent 210 has been deposited to increase to a level that is above a melting point temperature of the particles 102. In addition, the energy supply system 206 may supply energy 208 at a level that is insufficient to cause the particles 102 upon which the fusing agent 210 has not been supplied to remain below the melting point temperature of the particles 102.

According to examples, the controller 110 may control the first agent delivery device 202 to selectively deposit the fusing agent 210 onto sets of particles 102 to form the feature 104 and may control the second agent delivery device 204 to selectively deposit an energy absorbing agent, which is represented by the arrow 212, onto other sets of particles 102 to form the thermal support 106. The energy absorbing agent 212 may also be a liquid, such as an ink, a pigment, a dye, or the like, that may enhance absorption of energy 208 emitted from the energy supply system 206. The second agent delivery device 204 may deliver the energy absorbing agent 212 in the form of droplets onto particles 102 such that the droplets of energy absorbing agent 212 may be dispersed on the particles 102 and within interstitial spaces between the particles 102 forming the thermal support 106.

In forming the thermal support 106, the droplets of energy absorbing agent 212 may be supplied at a sufficiently low density, e.g., contone level, to absorb sufficient energy 208 to cause the temperature of the particles 102 on which the energy absorbing agent 212 has been deposited to increase, but to a level that is below the melting point temperature of the particles 102. In other words, the droplets of energy absorbing agent 212 may be supplied at a sufficiently low density to increase the temperature of the particles 102 forming the thermal support 106 without causing those particles 102 to fuse together.

According to examples, the energy absorbing agent 212 may be a degradable agent that is to degrade within a predetermined time period following receipt of the supplied energy 208 or in the presence of another agent. For instance, the degradable agent may be a liquid that is to degrade, e.g., evaporate, disintegrate, or the like, for instance, after a few minutes, a few hours, etc., after receiving the energy 208. In some examples, the degradable agent may be degradable through receipt of a chemical agent, for instance, that degrades the degradable agent without degrading or harming the particles 102. The degradable agent may degrade during fabrication of an object or following fabrication of the object. In any of these examples, the particles 102 upon which the energy absorbing agent 212 has been deposited may be reused, e.g., recycled, following degradation of the energy absorbing agent 212. In any of these examples, the density level, e.g., the contone level, at which the droplets of the energy absorbing agent 212 are deposited to form the thermal support 106 may substantially be lower than the density level at which the droplets of the fusing agent 210 are deposited to form the feature 104.

Although not shown, the energy supply system 206 may include a single energy supply device or multiple energy supply devices. In any regard, the energy supply system 206 may supply any of various types of energy. For instance, the energy supply system 206 may supply energy in the form of light (visible, infrared, or both), in the form of heat, in the form of electromagnetic energy, combinations thereof, or the like. According to examples, the type and/or amount of fusing agent 210 and in some examples, the type and/or amount of energy absorbing agent 212 deposited onto the particles 102, may be tuned to the type and strength of the energy 208 that the energy supply system 206 emits such that, for instance, the particles 102 may be heated as intended. By way of example, the tuning may be implemented to maximize the heating of the particles 102 while minimizing the amount of energy 208 applied by the energy supply system 206.

The 3D fabrication system 200 may also include build platform 220, which may be in a build chamber (which may define a build envelope) within which 3D objects may be fabricated from the particles 102 provided in respective layers on the build platform 220. Particularly, the build platform 220 may be provided in a build chamber and may be moved downward as features of a 3D object are formed in successive layers of the particles 102. Although not shown, the particles 102 may be supplied between a recoater 222 and the build platform 220 and the recoater 222 may be moved in a direction represented by the arrow 224 across the build platform 220 to spread the particles 102 into a layer.

In addition, the first agent delivery device 202, the second agent delivery device 204, and the energy supply system 206 may be moved across the build platform 220 as indicated by the arrow 226 to fuse together particles 102 in selected areas of layers of particles 102. For instance, the first agent delivery device 202, the second agent delivery device 204, and the energy supply system 206 may be supported on a carriage that is to move in the directions 226. In some examples, the recoater 222 may be provided on the same carriage. In other examples, the first agent delivery device 202, the second agent delivery device 204, and the energy supply system 206 may be supported on a plurality of carriages such that the first agent delivery device 202 and the second agent delivery device 204, and the energy supply system 130 may be moved separately with respect to each other. In any regard, following formation of a layer of particles 102 and a portion of a 3D object on the layer, the recoater 222 may be implemented to form another layer and this process may be repeated to fabricate the 3D object.

Although not shown, the 3D fabrication system 200 may include a heater to maintain an ambient temperature of the build envelope or chamber at a relatively high temperature. In addition or in other examples, the build platform 220 may be heated to heat the particles 102 to a relatively high temperature. The relatively high temperature may be a temperature near the melting temperature of the particles 102 such that a relatively low level of energy 208 may be applied to selectively fuse the particles 102.

Figure 3:
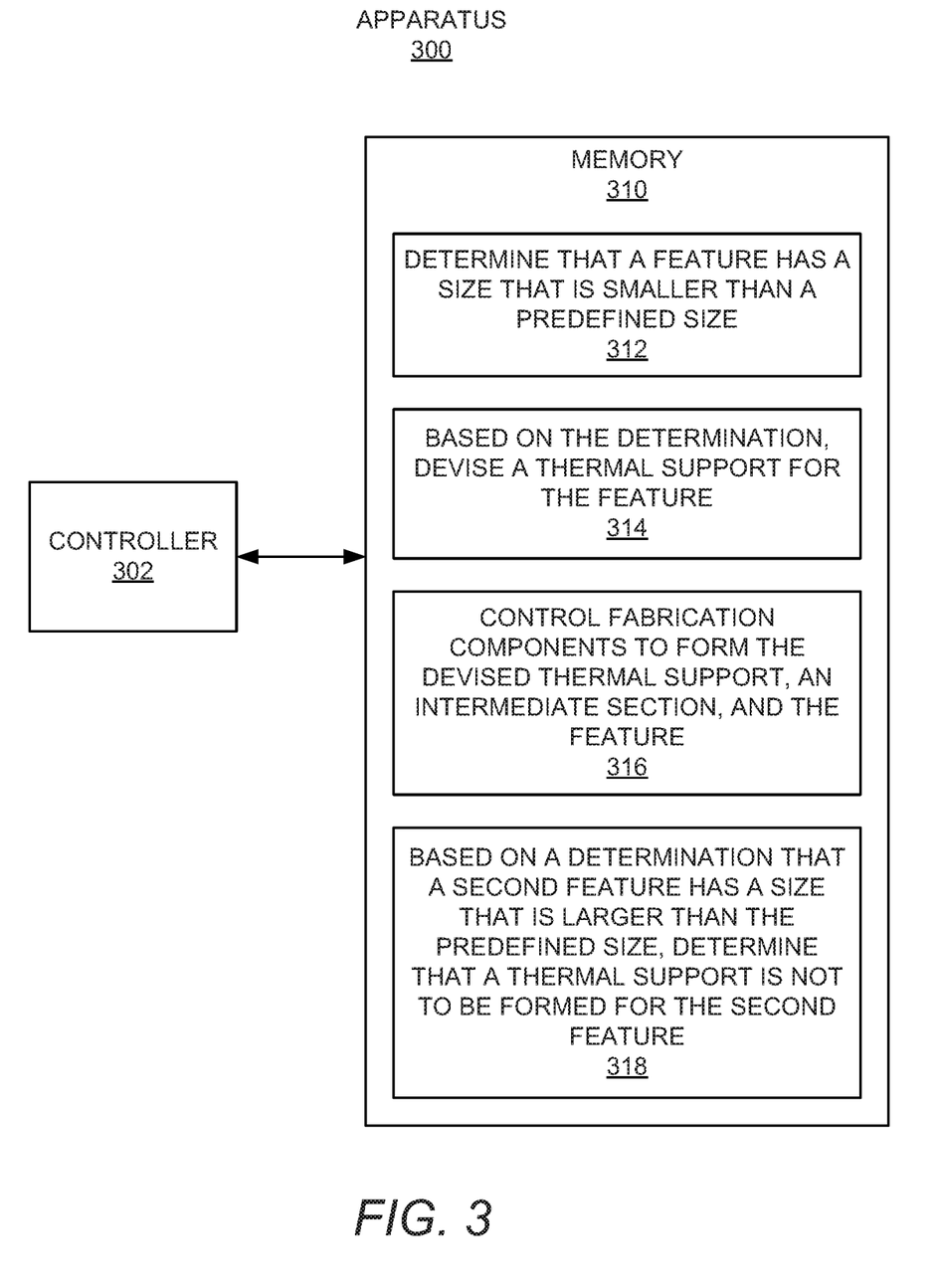
FIG. 3 shows a block diagram of an example apparatus that may form a thermal support prior to formation of a feature of a 3D object.

With reference now to FIG. 3, there is shown a block diagram of an example apparatus 300 that may form a thermal support prior to formation of a feature of a 3D object. It should be understood that the example apparatus 300 depicted in FIG. 3 may include additional features and that some of the features described herein may be removed and/or modified without departing from the scope of the apparatus 300. In addition, the features of the apparatus 300 are described with respect to the components of the 3D fabrication systems 100, 200 discussed above with respect to FIGS. 1A and 2.

Generally speaking, the apparatus 300 may be a computing device, a control device of a 3D fabrication system 100, 200, or the like. As shown in FIG. 3, the apparatus 300 may include a controller 302 that may control operations of the apparatus 300. The controller 302 may be equivalent to the controller 110 discussed above. The controller 302 may be a semiconductor-based microprocessor, a central processing unit (CPU), an application specific integrated circuit (ASIC), a field-programmable gate array (FPGA), and/or other suitable hardware device.

The apparatus 300 may also include a memory 310 that may have stored thereon machine readable instructions 312-318 (which may also be termed computer readable instructions) that the controller 302 may execute. The memory 310 may be an electronic, magnetic, optical, or other physical storage device that contains or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The controller 302 may fetch, decode, and execute the instructions 312 to determine that a feature 104 of a 3D object has a size that is smaller than a predefined size. The predefined size may be indicative of a likelihood that the feature 104 will not reach a sufficient temperature for an intended fusing level of the particles forming the feature 104.

The controller 302 may fetch, decode, and execute the instructions 314 to, based on the determination that the feature 104 has a size that is smaller than the predefined size, devise a thermal support 106 for the feature 104. The controller 302 may devise (or equivalently, determine) the thermal support 106 for the feature 104 through determination of a size and a location within a build envelope of the thermal support 106 for the feature 104. In some examples, the controller 302 may devise the thermal support 106 based upon the size and the location of the feature 104. The controller 302 may also, or in other examples, devise the thermal support 106 based upon the temperatures that the layers of particles 102 are predicted to reach during formation of the 3D object containing the feature 104. That is, for instance, the controller 302 may determine that the temperature in an area where the feature 104 is to be formed may be predicted to be above a predefined temperature when the feature 104 is formed as may occur when a larger portion of fused particles is to be formed near that area. In this example, the controller 110 may determine that a thermal support 106 may not be formed near that area.

The controller 302 may fetch, decode, and execute the instructions 316 to control fabrication components 120 to form the devised thermal support 106 for the feature 104 from a first set of particles 102, an intermediate section 108 from a second set of particles 102, and the feature 104 from a third set of particles 102. The first set of particles 102 may be in a first set of layers of particles 102, the second set of particles 102 may be in a second set of layers of particles 102 above the first set, and the third set of particles 102 may be in a third set of layers of particles 102 above the second set. The thermal support 106 may be formed through application of energy onto the first set of particles 102. The intermediate section 108 may be formed through spreading of one or more layers of the second set of particles 102 on the thermal support 106, in which the second set of particles 102 may be unfused to other particles 102. The feature 104 may be formed through application of energy onto the third set of particles 102 sufficient to melt those particles 102.

The controller 302 may fetch, decode, and execute the instructions 318 to, based on a determination that a second feature has a size that is larger than the predefined size, determine that a thermal support is not to be formed for the second feature.

In other examples, instead of the memory 310, the apparatus 300 may include hardware logic blocks that may perform functions similar to the instructions 312-318. In yet other examples, the apparats 300 may include a combination of instructions and hardware logic blocks to implement or execute functions corresponding to the instructions 312-318. In any of these examples, the controller 302 may implement the hardware logic blocks and/or execute the instructions 312-318.

Figure 4:
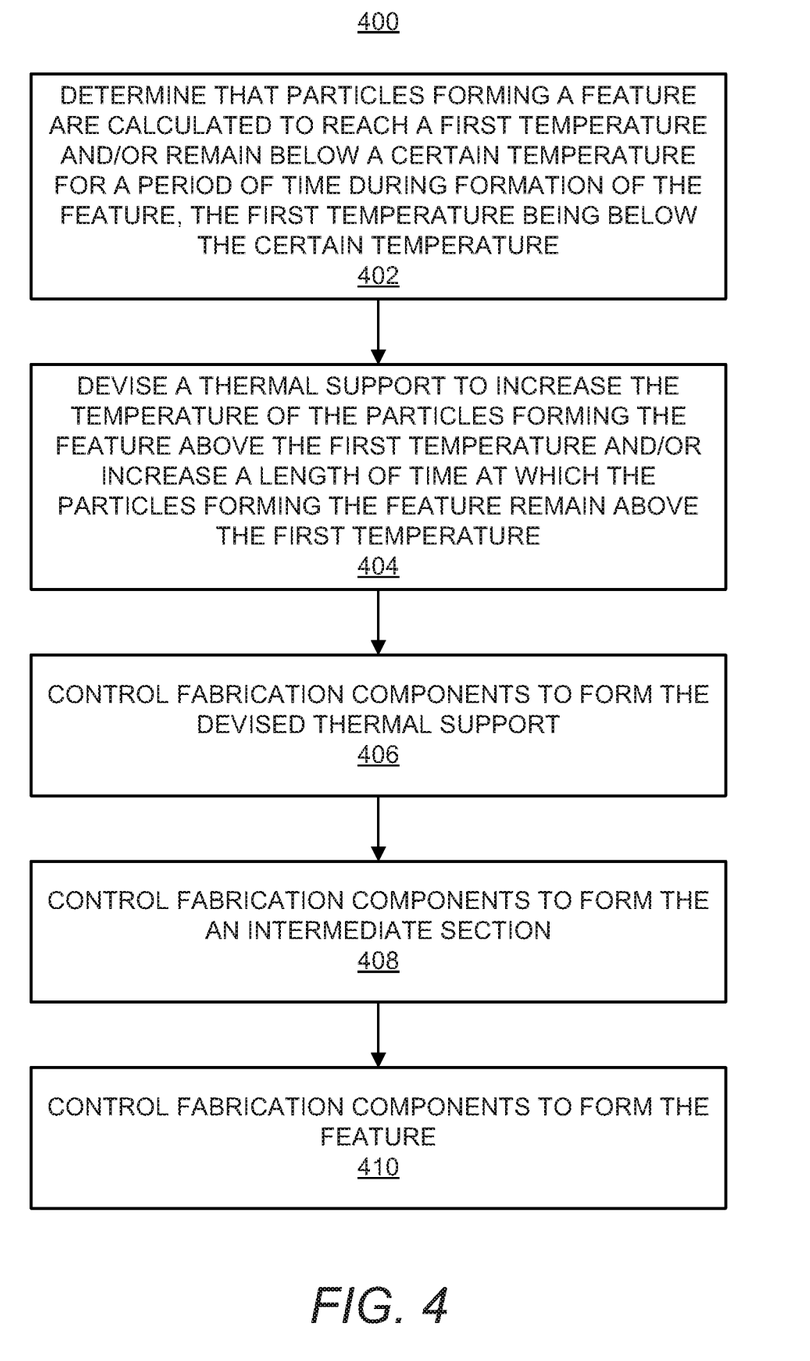
FIG. 4 shows a flow diagram of an example method for forming a thermal support for a feature of a 3D object to increase a temperature of particles forming the feature.

Various manners in which the controller 110, 302 may operate are discussed in greater detail with respect to the method 400 depicted in FIG. 4. Particularly, FIG. 4 depicts a flow diagram of an example method 400 for forming a thermal support 106 for a feature 104 a 3D object to increase a temperature of particles 102 forming the feature 104. It should be understood that the method 400 depicted in FIG. 4 may include additional operations and that some of the operations described therein may be removed and/or modified without departing from scope of the method 400. The description of the method 400 is made with reference to the features depicted in FIGS. 1A-3 for purposes of illustration.

At block 402, the controller 110, 302 may determine that particles 102 forming a feature 104 of a 3D object are calculated to reach a first temperature to remain below a certain temperature for a period of time, or both, during formation of the feature 104, the first temperature being below a certain temperature. The certain temperature may be a melting point temperature of the particles 102 or a temperature near the melting point temperature of the particles 102. The controller 110, 302 may determine the calculated temperature of the particles 102 forming the feature 104 based on a number of factors. For instance, the determination may be made based on the size of the feature 104 and thus, for instance, the amount of energy to be absorbed by those particles 102. In addition or in other examples, the determination may be made based on anticipated temperatures of other features of the 3D object or other 3D objects near those particles 102. That is, the controller 110, 302 may determine an anticipated thermal profile of a build envelope in which the 3D object is fabricated to determine the temperature that the particles 102 forming the feature 104 are calculated to reach. The controller 110, 302 may determine the anticipated thermal profile through modeling, simulations, historical data, or the like.

At block 404, the controller 110, 302 may devise a thermal support 106 to increase the temperature of the particles 102 forming the feature 104 above the first temperature, to increase a length of time at which the particles forming the feature remain above the first temperature, or both. The controller 110, 302 may devise the thermal support 106 through modeling or otherwise determining the location and size of the thermal support 106 to be formed to raise the temperature of the particles 102 forming the feature 104. The controller 110, 302 may also determine whether the particles 102 forming the thermal support 106 are to be fused together or not. According to examples, the controller 110, 302 may devise the thermal support 106 to have a larger volumetric size than a volumetric size of the feature 104.

At block 406, the controller 110, 302 may control fabrication components 120 to form the devised thermal support 106 at a location of a build envelope that enables heat to be transferred from the thermal support 106 to the particles forming the feature 104. That is, the controller 110, 302 may control the fabrication components 120 to form the thermal support 106 from a set of particles 102 that are in a plurality of layers of particles 102 beneath the layers of particles 102 forming the feature 104, e.g., within a predefined number of intermediate layers. In addition, the controller 110, 302 may control the fabrication components 120 in any of the manners discussed above to form the thermal support 106. That is, for instance, the thermal support 106 may be formed of fused particles 106 and/or unfused particles 106.

At block 408, the controller 110, 302 may control the fabrication components 120 to form an intermediate section 108 adjacent to the thermal support 106. The controller 110, 302 may control the fabrication components 120 to spread at least one layer of unfused particles 102 on the thermal support 106. In addition, the controller 110, 302 may control the fabrication components to heat the particles 102 forming the intermediate section 108 without causing those particles 102 to fuse together in any of the manners discussed herein.

At block 410, the controller 110, 302 may control the fabrication components 120 to form the feature 104. The controller 110, 302 may control the fabrication components 120 to fuse a set of particles 102 to form the feature 104.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) fabrication system comprising:
   a fusing agent;
   an energy absorbing agent different from the fusing agent;
   an agent delivery system;
   an energy supply system; and
   a controller to:
      identify a first feature of an object to be fabricated;
      form the first feature by controlling the agent delivery system to deposit the fusing agent onto a fusing area of a layer of particles of build material;
      determine a predefined size based on a type of the particles, a type of the fusing agent, and a type of energy to be emitted by the energy supply system;
      determine that a size of the fusing area that forms the first feature is smaller than the predefined size;
      based on the determination that the size of the fusing area that forms the first feature is smaller than the predefined size, determine that a thermal support for the first feature is to be fabricated, wherein the thermal support is to be separated from the first feature by an intermediate section;
      form the thermal support by controlling the agent delivery system to deposit the energy absorbing agent onto an unfused area of the layer of particles that is separated from the fusing area by the intermediate section;
      form the intermediate section between the fusing area that forms the first feature and the unfused area that forms the thermal support, wherein the intermediate section is free of any fusing agent and any energy absorbing agent; and
      control the energy supply system to supply energy onto the fusing area that forms the first feature and the unfused area that forms the thermal support, wherein the supplied energy causes the particles in the fusing area to melt, and causes the energy absorbing agent in the unfused area to absorb the supplied energy to increase a temperature of the particles in the unfused area to a temperature below a melting point temperature of the particles to enable the particles in the unfused area to be heated without melting.

2. The 3D fabrication system of claim 1, wherein the particles in the unfused area that forms the thermal support have a higher temperature than the particles in the fusing area that forms the first feature during the forming of the thermal support and the first feature.

3. The 3D fabrication system of claim 1, wherein the particles in the intermediate section are unfused to each other.

4. The 3D fabrication system of claim 1, wherein the controller is further to:
   identify a second feature of the object; and
   based on the identified second feature having a size that is larger than the predefined size, control the agent delivery system and the energy supply system to form the identified second feature without forming a thermal support for the identified second feature.

5. The 3D fabrication system of claim 1, further comprising:
   a recoater to spread the layer of particles.

6. The 3D fabrication system of claim 1, wherein the energy absorbing agent in the unfused area is a degradable agent that is to evaporate or disintegrate within a predetermined time period following receipt of the supplied energy.

7. The 3D fabrication system of claim 1, wherein the controller is further to control the agent delivery system to deposit droplets of the energy absorbing agent at a sufficiently low contone level to cause the particles in the unfused area to remain unfused responsive to the receipt of the supplied energy.

8. The 3D fabrication system of claim 1, wherein the particles comprise a plastic, a ceramic, a nylon, or a combination thereof, material.

9. An apparatus comprising:
   a fusing agent;
   an energy absorbing agent different from the fusing agent;
   a controller; and
   a memory storing machine readable instructions that when executed by the controller cause the controller to:
      form a first feature of a 3D object by depositing the fusing agent onto a fusing area of a layer of particles of build material;
      determine a predefined size based on a type of the particles, a type of the fusing agent, and a type of energy to be emitted by an energy supply system;
      determine that a size of the fusing area that forms the first feature is smaller than the predefined size;
      based on the determination that the size of the fusing area that forms the first feature is smaller than the predefined size, devise a thermal support to be fabricated for the first feature, wherein the thermal support is separated from the first feature by an intermediate section;
      form the thermal support by depositing the energy absorbing agent onto an unfused area of the layer of particles that is separated from the fusing area by the intermediate section;
      form the intermediate section between the fusing area that forms the first feature and the unfused area that forms the thermal support, wherein the intermediate section is free of any fusing agent and any energy absorbing agent; and control to supply energy onto the fusing area that forms the first feature and the unfused area that forms the thermal support, wherein the supplied energy causes the particles in the fusing area to melt, and causes the energy absorbing agent in the unfused area to absorb the supplied energy to increase a temperature of the particles in the unfused area to a temperature below a melting point of the particles, wherein the increase in the temperature of the particles in the thermal support is to reduce a thermal bleeding rate of the particles in the fusing area.

10. The apparatus of claim 9, wherein the controller is further to:
identify a second feature of the 3D object having a size that is larger than the predefined size; and
based on the identified second feature having a size that is larger than the predefined size, form the identified second feature on the layer of particles without forming a thermal support for the identified second feature.

11. The apparatus of claim 9, wherein the particles comprise a plastic, a ceramic, a nylon, or a combination thereof, material.

12. The apparatus of claim 9, wherein the energy absorbing agent deposited onto the unfused area has a sufficiently low contone level to cause the particles in the unfused area to remain unfused in response to the receipt of the supplied energy.

13. The apparatus of claim 9, wherein the energy absorbing agent in the unfused area is a degradable agent that is to evaporate or disintegrate within a predetermined time period following receipt of the supplied energy.

* * * * *